(12) United States Patent
Pitman

(10) Patent No.: US 10,213,043 B1
(45) Date of Patent: Feb. 26, 2019

(54) CORN CREAMER

(71) Applicant: Roger N. Pitman, Minden, LA (US)

(72) Inventor: Roger N. Pitman, Minden, LA (US)

(*) Notice: Subject to any disclaimer, the term of this patent is extended or adjusted under 35 U.S.C. 154(b) by 0 days.

(21) Appl. No.: 15/988,017

(22) Filed: May 24, 2018

(51) Int. Cl.
| | | |
|---|---|---|
| *A47J 17/00* | (2006.01) | |
| *A47J 17/16* | (2006.01) | |
| *A01F 11/06* | (2006.01) | |

(52) U.S. Cl.
CPC .............. *A47J 17/16* (2013.01); *A01F 11/06* (2013.01)

(58) Field of Classification Search
CPC ........... A47J 17/16; A01F 11/06; A23N 15/02
USPC ...... 460/45, 46, 49, 58, 56, 51; 82/173, 113, 82/128, 130; 99/514, 575, 580, 589, 590, 99/594, 595, 596, 597, 598, 599, 537, 99/538, 539, 540, 542, 543, 544, 545, 99/567, 584, 588, 636, 643
See application file for complete search history.

(56) References Cited

U.S. PATENT DOCUMENTS

| | | | | |
|---|---|---|---|---|
| 14,771 | A * | 4/1856 | Mathers ................. | A01F 11/06 460/46 |
| 19,253 | A * | 2/1858 | Lindner ................. | A01F 11/06 460/46 |
| 77,494 | A * | 5/1868 | Jones ..................... | A01F 11/06 460/45 |
| 197,145 | A * | 11/1877 | Kirk ....................... | A01F 11/06 30/121.5 |
| 240,052 | A * | 4/1881 | Stover ..................... | A01F 11/06 460/54 |
| 422,384 | A * | 3/1890 | Darley .................... | A01F 11/06 30/121.5 |
| 726,524 | A * | 4/1903 | Furrow ................... | A01F 11/06 30/121.5 |
| 935,517 | A * | 9/1909 | Johnson ................. | A01F 11/06 30/121.5 |
| 961,825 | A * | 6/1910 | Wells ...................... | A01F 11/06 30/121.5 |
| 1,018,788 | A * | 2/1912 | Stone ...................... | A01F 11/06 294/99.2 |
| 1,127,548 | A * | 2/1915 | Turner ................... | A01F 11/06 460/17 |
| 1,408,135 | A * | 2/1922 | Osgood ................... | A01F 11/06 460/53 |
| 1,414,372 | A * | 5/1922 | Olcott ..................... | A01F 11/06 30/121.5 |
| 1,633,365 | A * | 6/1927 | Ebmeier ................ | A01F 11/06 30/121.5 |

(Continued)

*Primary Examiner* — Jimmy Chou
(74) *Attorney, Agent, or Firm* — R. Keith Harrison

(57) ABSTRACT

A corn creamer may include a creamer base. A rotatable sleeve drive shall may be carried by the creamer base. A creamer sleeve may he drivingly engaged for rotation by the sleeve drive shaft. The creamer sleeve may have a sleeve wall and a sleeve interior formed by the sleeve wall. At least one creamer blade assembly may include at least one blade shaft carried by the sleeve wall of the creamer sleeve. At least one creamer blade may be carried by the at least one blade shaft in the sleeve interior of the creamer sleeve. In some, applications, a hand drill may be coupled to the sleeve drive shaft to rotate the sleeve drive shaft as an ear of corn is inserted into the rotating creamer sleeve. The at least one creamer blade of the at least one creamer blade assembly may contact the corn kernels on the ear of corn to remove the corn kernels typically for preparation of creamed corn.

20 Claims, 11 Drawing Sheets

(56) References Cited

U.S. PATENT DOCUMENTS

| | | | | | |
|---|---|---|---|---|---|
| 1,799,588 A * | 4/1931 | Hurlburt | A01F 11/06 15/105 |
| 1,828,647 A * | 10/1931 | Douthitt | A01F 11/06 460/49 |
| 1,828,648 A * | 10/1931 | Douthitt | A01F 11/06 460/54 |
| 1,828,649 A * | 10/1931 | Douthitt | A01F 11/06 460/54 |
| 2,029,344 A * | 2/1936 | Sheldon | A01F 11/06 460/52 |
| 2,063,483 A * | 12/1936 | Bulmer | A01F 11/06 294/5 |
| 2,214,285 A * | 9/1940 | Schmidt | A01F 11/06 460/116 |
| 2,326,873 A * | 8/1943 | Meek | A01F 11/06 30/121.5 |
| 2,415,114 A * | 2/1947 | Skolrud | A01F 11/06 30/121.5 |
| 2,447,301 A * | 8/1948 | Wright | A47J 43/28 30/121.5 |
| 2,493,588 A * | 1/1950 | Martin | A01F 11/06 30/121.5 |
| 2,566,568 A * | 9/1951 | Ives | A01F 11/06 460/17 |
| 2,609,852 A * | 9/1952 | Houldsworth | A01F 11/06 30/121.5 |
| 2,785,463 A * | 3/1957 | Ager | A47J 43/28 30/121.5 |
| 2,787,273 A * | 4/1957 | Kerr | A01F 11/06 460/53 |
| 2,811,844 A * | 11/1957 | Selmer | A47G 19/303 118/13 |
| 2,998,833 A * | 9/1961 | Kosmerl | A01F 11/06 460/45 |
| 3,176,390 A * | 4/1965 | Robinson | A47J 17/04 30/123.7 |
| 3,455,307 A * | 7/1969 | Ross | A01F 11/06 460/1 |
| 3,625,223 A * | 12/1971 | Shuler | A01F 11/06 460/53 |
| 4,753,159 A * | 6/1988 | Eaton | A47J 17/16 460/51 |
| 4,885,842 A * | 12/1989 | Marley | A47J 17/02 30/121.5 |
| 5,097,758 A * | 3/1992 | Fresh | A47J 17/16 241/169 |
| 6,305,276 B1 * | 10/2001 | Backus | A01F 11/06 460/45 |
| 6,463,845 B1 * | 10/2002 | Thomas | A23N 15/02 460/45 |
| 6,644,180 B1 * | 11/2003 | Ward | A47J 17/16 30/121.5 |
| 6,729,228 B2 * | 5/2004 | Thomas | A23N 15/00 99/537 |
| D624,792 S * | 10/2010 | Ghassemian | D7/693 |
| 9,131,796 B2 * | 9/2015 | Holt | A47J 17/16 |
| 2012/0325096 A1 * | 12/2012 | Holt | A47J 17/16 99/567 |

* cited by examiner

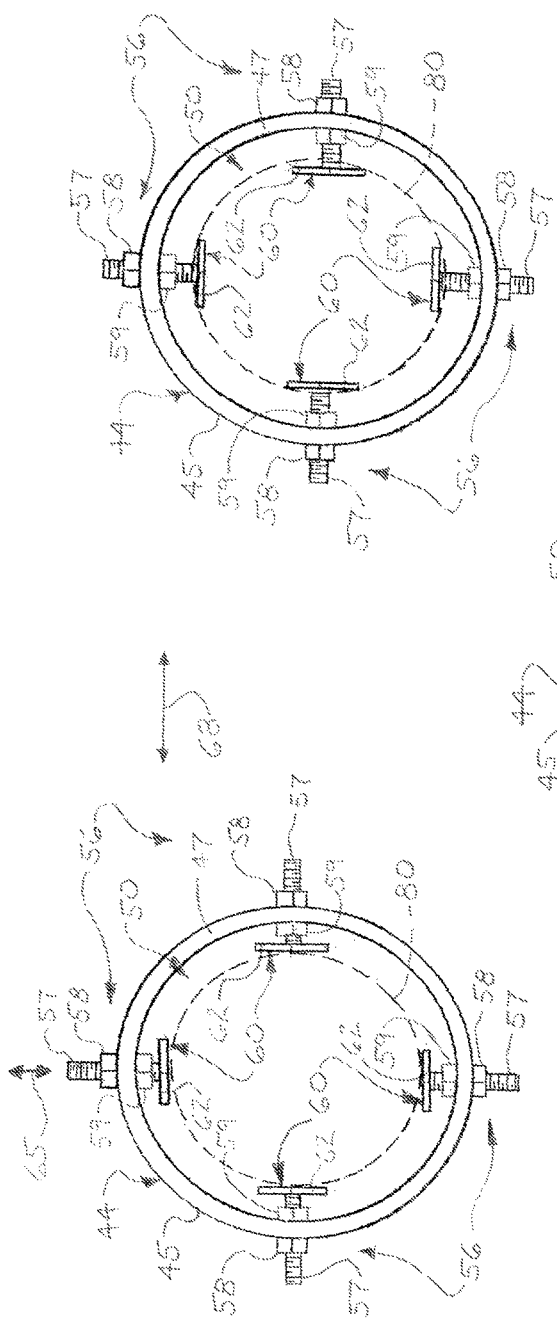
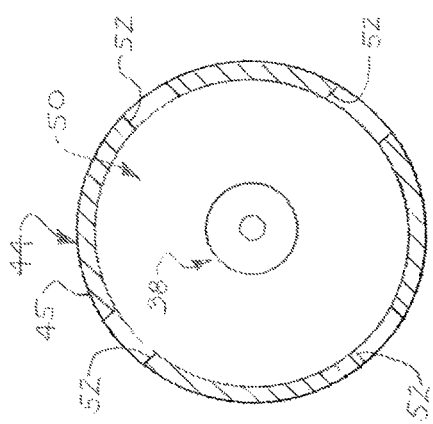

CORN CREAMER

FIELD

Illustrative embodiments of the disclosure generally relate to apparatuses for creaming corn. More particularly, illustrative embodiments of the disclosure relate to a corn creamer having a rotating creamer sleeve into which an ear of corn can be inserted to remove corn kernels from the ear of corn.

SUMMARY

Illustrative embodiments of the disclosure are generally directed to a corn creamer. An illustrative embodiment of the corn creamer may include a creamer base. A rotatable sleeve drive shaft may be carried by the creamer base. A creamer sleeve may be drivingly engaged for rotation by the sleeve drive shaft. The creamer sleeve may have a sleeve wall and a sleeve interior formed by the sleeve wall. At least one creamer blade assembly may include at least one blade shaft carried by the sleeve wall of the creamer sleeve. The at least one blade shaft may have a blade shaft axis. At least one creamer blade may be carried by the at least one blade shaft in the sleeve interior of the creamer sleeve. The at least one creamer blade may have a cutting plane perpendicular to the blade shaft axis of the at least one blade shaft.

In some embodiments, the corn creamer may include a creamer base. A rotatable sleeve drive shaft may be carried by the creamer base. A creamer sleeve may be drivingly engaged for rotation by the sleeve drive shaft. The creamer sleeve may have a sleeve wall with as drive end and an corn insert end a sleeve interior formed by the sleeve wall and extending from the drive end to the corn insert end and at least one sleeve aperture extending through the sleeve wall. At least one creamer blade assembly may be carried by the sleeve wall of the creamer sleeve. The at least one creamer blade assembly may include at least one blade shaft carried by the sleeve wall, the at least one blade shaft configured for selective rotational and radial adjustment within the sleeve interior. At least one creamer blade may be carried by the at least one blade shaft in the sleeve interior. The at least one creamer blade may include a proximal blade end proximate the blade shaft and a distal blade end distal to the blade shaft. At least one cutting edge may extend between the proximal blade end and the distal blade end.

BRIEF DESCRIPTION OF THE DRAWINGS

Illustrative embodiments of the disclosure will now be described, by way of example, with reference to the accompanying drawings, in which:

FIG. 6 is a front view, taken along viewing lines 6-6 in FIG. 4, of the creamer sleeve with an ear of corn (illustrated in phantom) placed in the creamer sleeve in typical application of the corn creamer, more particularly illustrating the creamer blades of multiple creamer blade assemblies shown in a corn-disengaging configuration in the creamer sleeve;

FIG. 7 is a front view of the creamer sleeve with the creamer blades engaging the ear of corn;

FIG. 8 is a cross-sectional view, taken along section lines 8-8 in FIG. 4, of the creamer sleeve;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations, All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore there is intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
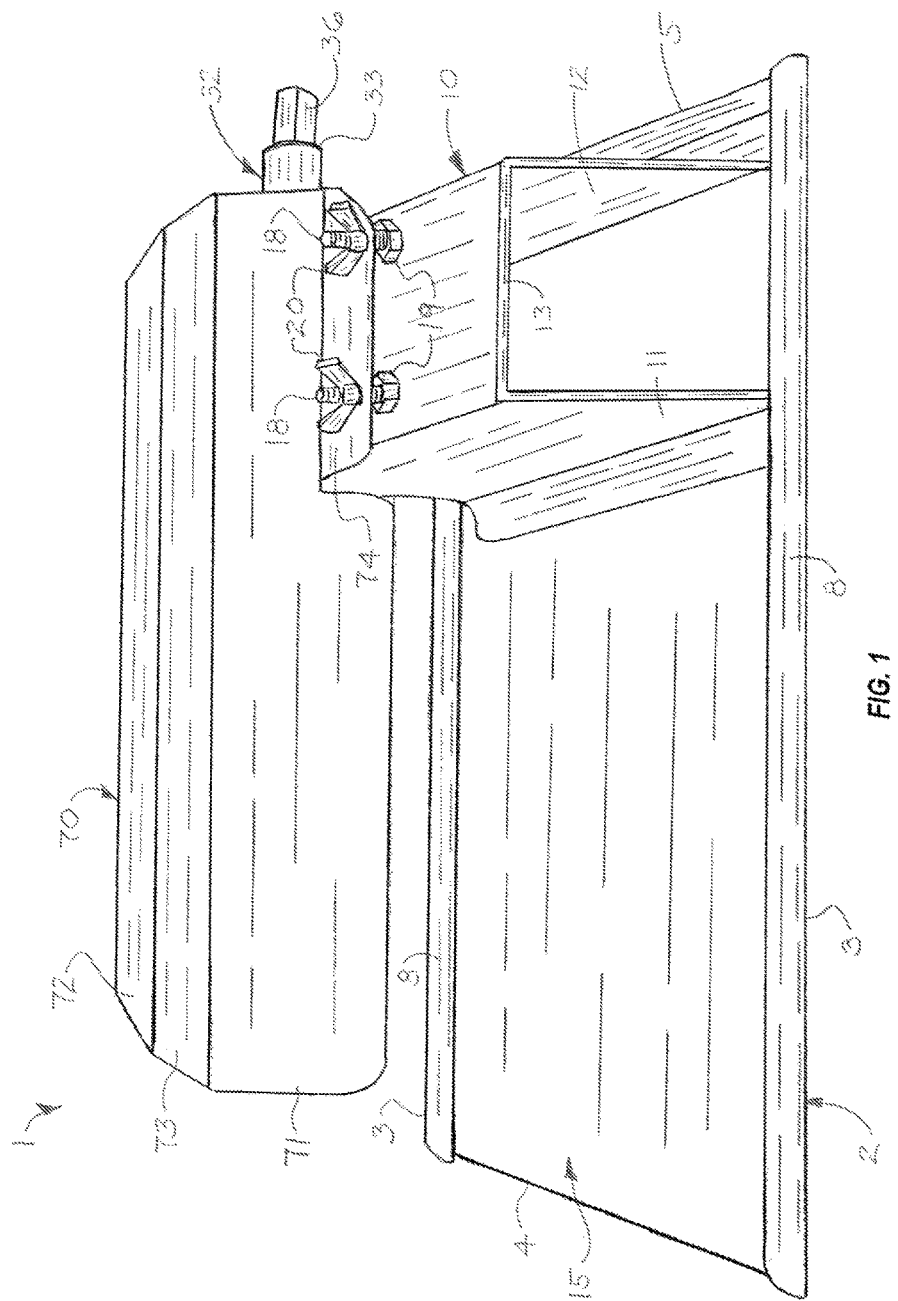
FIG. 1 is a side perspective view of an illustrative embodiment of the corn creamer.
Figure 2:
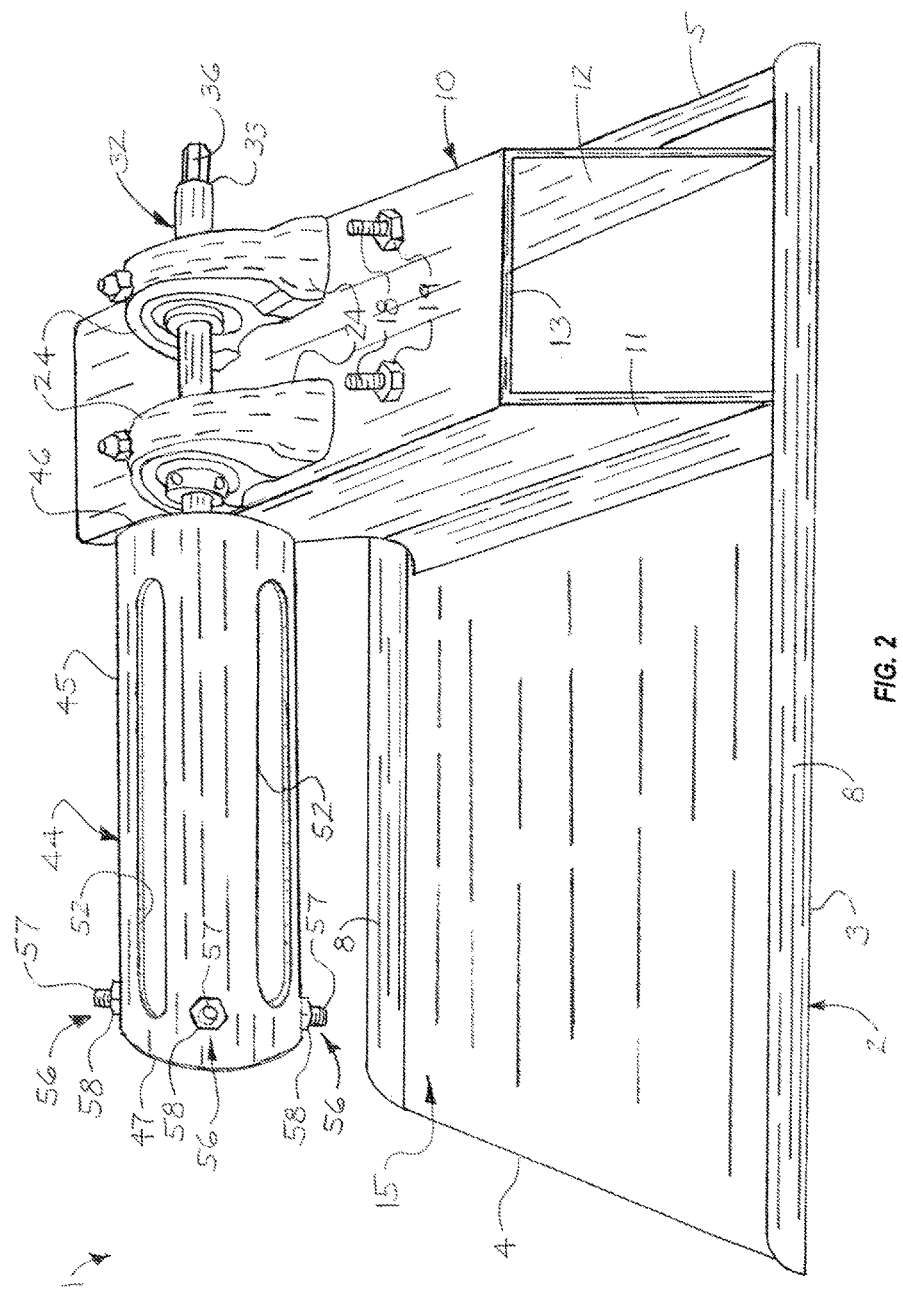
FIG. 2 is a side perspective view of the illustrative corn creamer, with a creamer shield removed to expose a creamer sleeve of the corn creamer.
Figure 11:
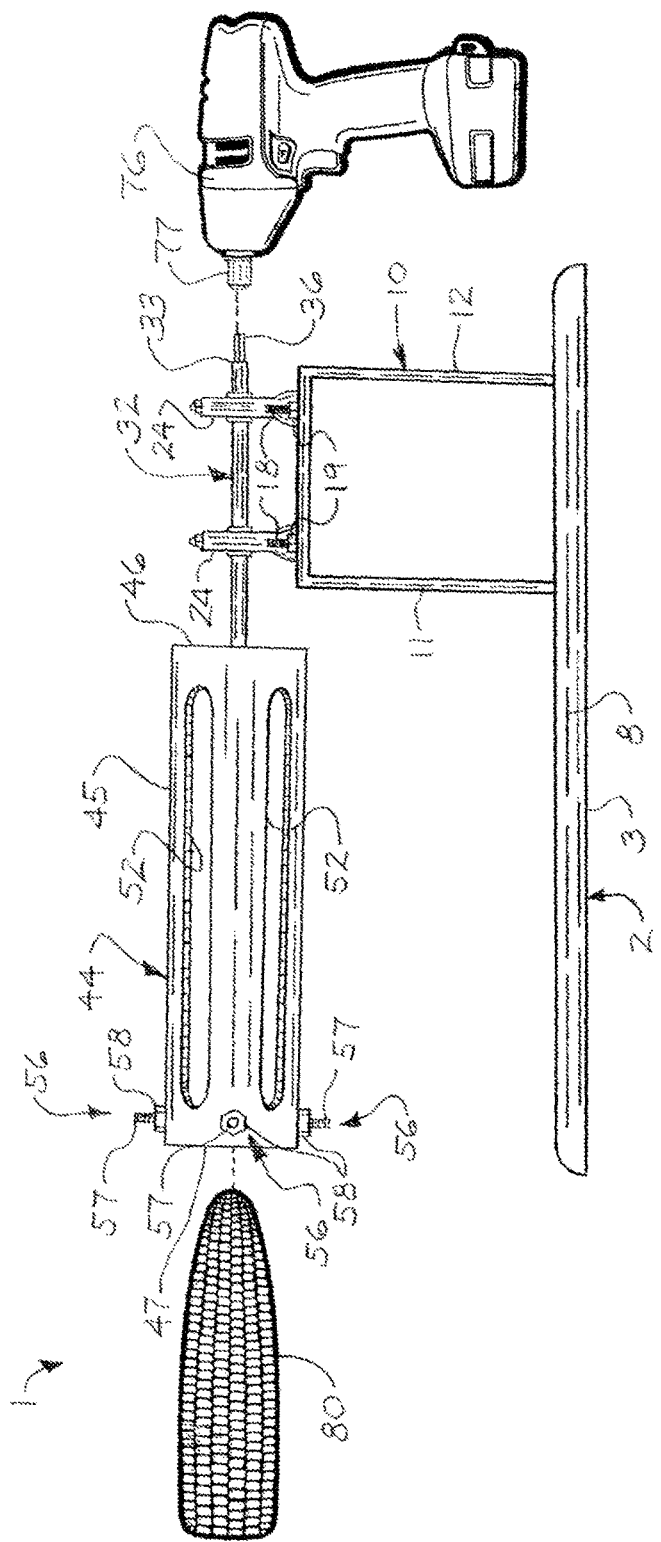
FIG. 11 is an exploded side view illustrating typical engagement of a hand drill with a sleeve drive shaft of the corn creamer to drive the creamer sleev and insertion of an ear of corn into the creamer sleeve preparatory to removal of corn kernels from the ear of corn.
Figure 12:
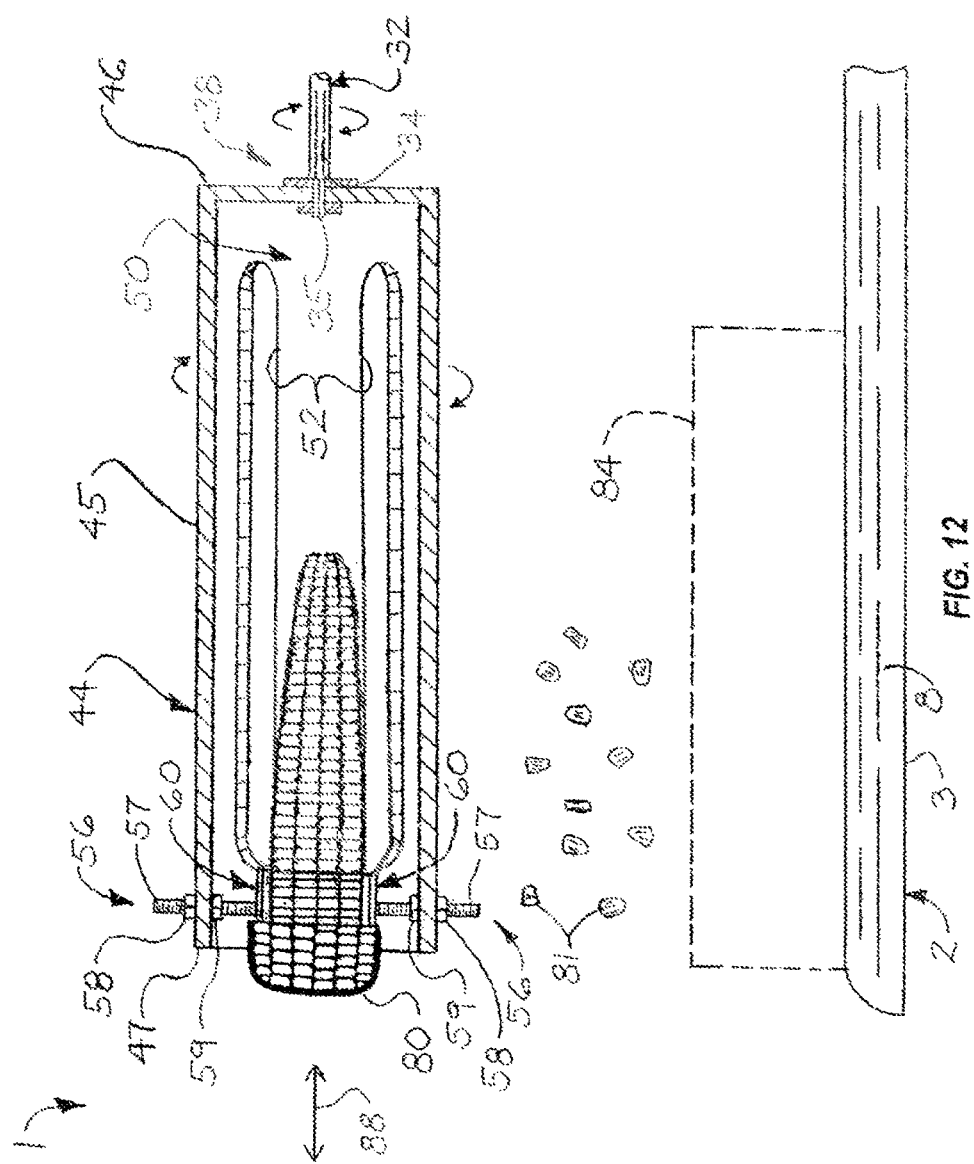
FIG. 12 is a side view of the creamer sleeve in longitudinal sectional view and a kernel-collecting container (illustrated in phantom) placed on the creamer base (shown in section) beneath the creamer sleeve, more particularly illustrating insertion o the ear of corn into the creamer sleeve as the creamer sleeve is rotated and removal of corn kernels from the ear of corn as the corn kernels fall through sleeve slots in the creamer sleeve into the kernel-collecting container in typical application of the corn creamer.

Referring to the drawings, an illustrative embodiment of the corn creamer is generally indicated by reference numeral 1. The corn creamer 1 may include a creamer base 2. A sleeve drive shaft 32 may be mounted for rotation on the creamer base 2 typically in a manner which will be hereinafter described. As illustrated in FIG. 2, a creamer sleeve 44 may be drivingly engaged for rotation by the sleeve drive shaft 32. As illustrated in FIG. 1, in some embodiments, a sleeve shield 70 may be deployed in place over the creamer sleeve 44. As illustrated in FIGS. 11 and 12 and will be hereinafter described, in some embodiments, the sleeve drive shaft 32 may be configured to be drivingly engaged for rotation by a hand drill 76 or other motor, As will be hereinafter described, the corn creamer 1 may be operable to remove corn kernels 81 (FIG. 12) from an ear of corn 80 as the ear of corn 80 is inserted in the rotating creamer sleeve 44 during operation of the hand drill 76 or other motor, typically for the purpose of preparing creamed corn from the corn kernels 81.

As illustrated in FIGS. 1 and 2, the creamer base 2 may have any design which is suitable for supporting the sleeve drive shaft 32, the creamer sleeve 44 and other components of the corn creamer 1. Accordingly, in some embodiments, the creamer base 2 may have a pair of spaced-apart side base edges 3. A front base edge 4 and a rear base edge 5 may extend between the side base edges 3. A pair of side base flanges 8 may extend upwardly from and along the respective side base edges 3. A container space 15 may be defined by and between the side base flanges 8 for purposes which will be hereinafter described.

A shaft mount platform 10 may be provided on the creamer base 2. The shaft mount platform 10 may have any design which is suitable for supporting the sleeve drive shaft 32 for rotation. In some embodiments, the shaft mount platform 10 may include a front platform wall 11 and a rear platform wall 12 upward standing from the creamer base 2 in parallel, spaced-apart relationship to each other. A platform bridge portion 13 may extend between the front platform wall 11 and the rear platform wall 12.

As further illustrated in FIG. 2, at least one shaft mount bearing 24 may be provided on the platform bridge portion 13 of the shaft mount platform 10. In some embodiments, the at least one shaft mount bearing 24 may include a pair of spaced-apart pillow mount bearings known by those skilled in the art as illustrated. In other embodiments, the at least one shaft mount bearing 24 may include any other type and number of bearings which are suitable for the purpose. The sleeve drive shaft 32 may be journaled for rotation in the shaft mount bearing or bearings 24 according to the knowledge of those skilled in the art.

Figure 5:
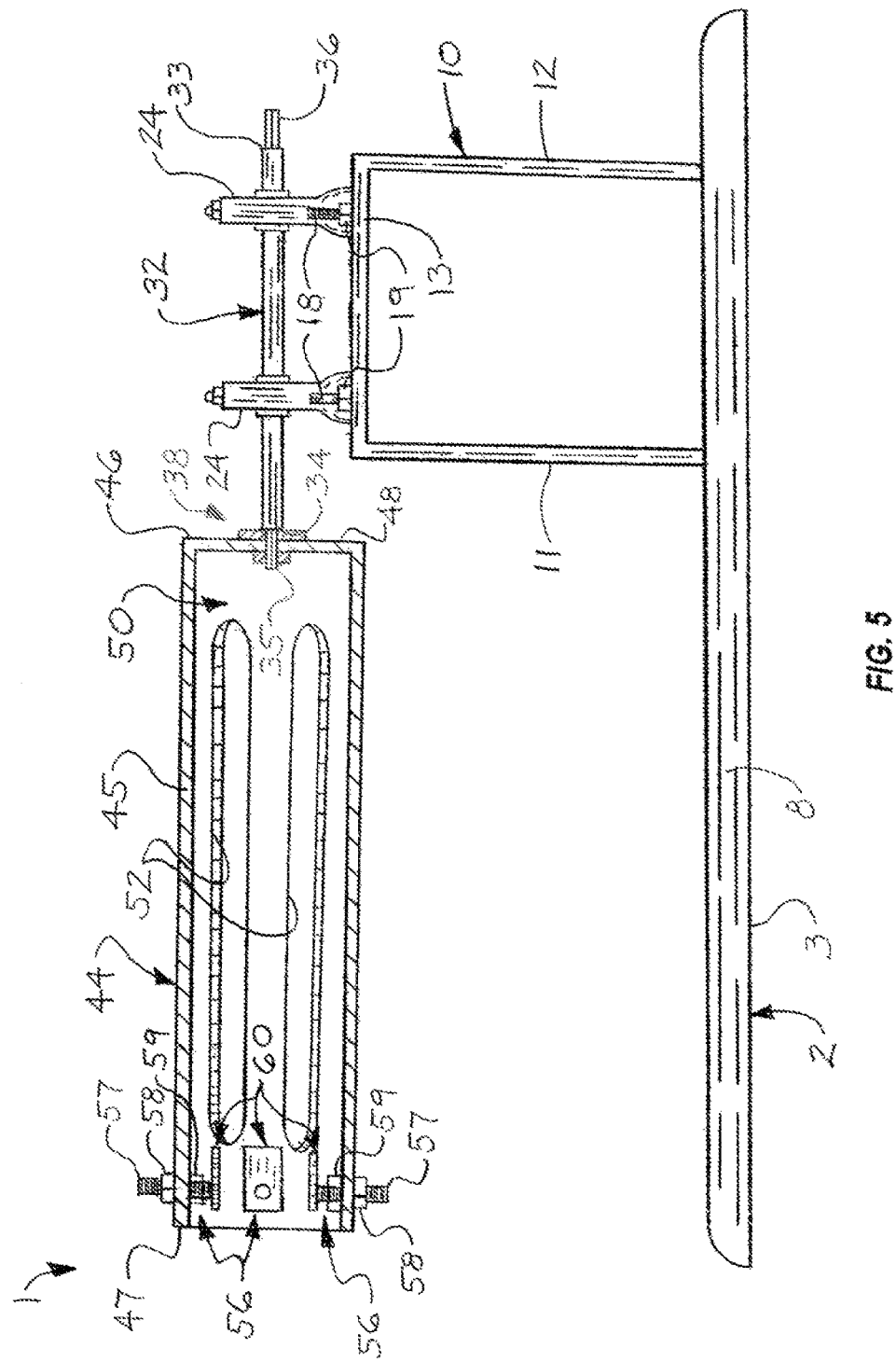
FIG. 5 is a side view of the illustrative corn creamer with the creamer shield removed and the creamer sleeve illustrated in longitudinal sectional view.

As illustrated in FIG. 5, the sleeve drive shall 32 may have a driven shaft end 33 and a drive shaft end 34. Shaft splines 36 may be provided on the driven shaft end 33 of the sleeve drive shaft 32. The shaft splines 36 may be suitably sized and configured to facilitate driving engagement of the hand drill 76 with the sleeve drive shaft 32. Accordingly, as illustrated in FIG. 11, the hand drill 76 may have a drill chuck 77 with an interior drill chuck cavity (not illustrated) which accepts and engages the shaft splines 36, as is known by those skilled in the art. In alternative embodiments, the sleeve drive shaft 32 may be suitably configured for driving engagement by an electric motor (not illustrated) which may be conventional. The electric motor may be mounted on or adjacent to the creamer base 2 according to the knowledge of those skilled in the art.

The creamer sleeve 44 may include a sleeve wall 45 having a drive end 46 and corn insert end 47. In some embodiments, the sleeve wall 45 may be generally elongated and cylindrical, as illustrated. A sleeve interior 50 may be formed by the sleeve wall 45 and may extend from the drive end-46 to the corn insert end 47. At least one sleeve aperture 52 may extend through the sleeve wall 45 in any selected size, number and pattern. In some embodiments, each sleeve aperture 52 may include an elongated sleeve slot, as illustrated. The sleeve slots 52 may be oriented in parallel, space-apart relationship to each other about the circumference of the sleeve wall 45. The creamer sleeve 44 may be drivingly mounted for rotation by the sleeve drive shaft 32 using any type of sleeve coupling 38 which is suitable for the purpose and known by those skilled in the art.

Figure 3:
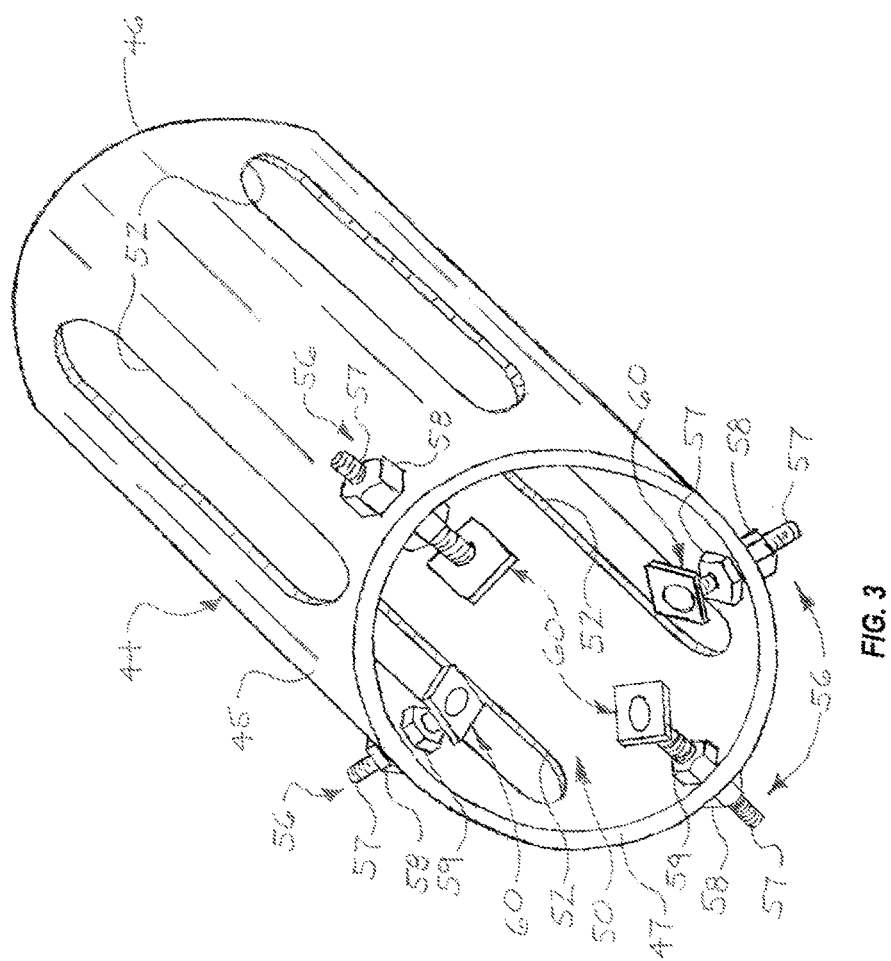
FIG. 3 is a front perspective view of a typical creamer sleeve of the corn creamer.

As illustrated in FIGS. 3 and 5-7, at least one creamer blade assembly 56 may include at least one blade shaft 57. The blade shaft 57 may be inserted through a blade shaft opening (not illustrated) which extends through the sleeve wall 45. As illustrated in FIG. 6, the blade shaft 57 may have a blade shaft axis 65. The blade shaft 57 of each creamer blade assembly 56 may be configured for selective rotational and radial adjustment within the sleeve interior 50 of the creamer sleeve 44. As illustrated in FIGS. 3 and 6, in some embodiments, an outer shall nut 58 and an inner shaft nut 59 may be threaded on the blade shaft 57 of each creamer blade assembly 56. The outer shaft nut 58 and the inner shaft nut 59 may threadably engage the exterior and interior surfaces, respectively, of the sleeve wall 45. Accordingly, the blade shaft 57 may be radially adjusted in the sleeve interior 50 along the blade shaft axis 65 by threaded adjustment of the outer shall nut 58 and inner shaft nut 59 on the blade shaft 57.

At least one creamer blade 60 may be provided on the blade shall 57 in the sleeve interior 50 of the creamer sleeve 44. As further illustrated in FIG. 6, each creamer blade 60 may have a cutting plane 68 which may be perpendicular to the blade shaft axis 65 of the blade shaft 57 of the corresponding creamer blade assembly 56.

Figure 9:
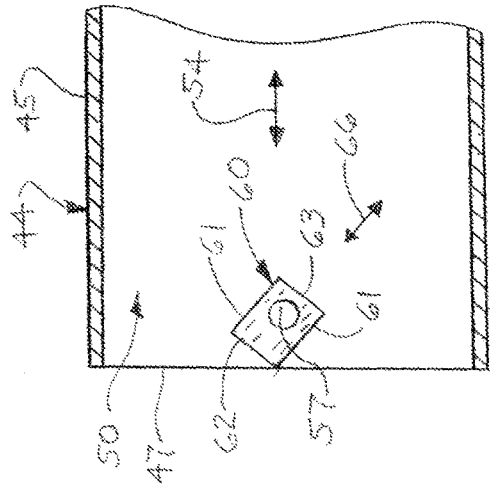
FIG. 9 is a sectional view of a distal corn insert end portion of the creamer sleeve, more particularly illustrating a first blade position or orientation of the creamer blade of each creamer blade assembly, resulting in courser corn in typical application of the corn creamer.
Figure 10A:
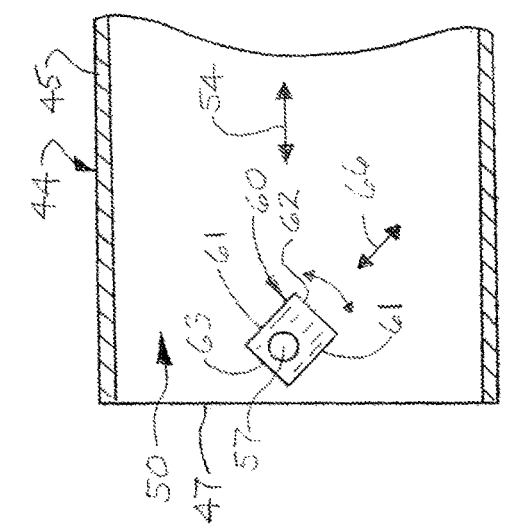
FIG. 10A is a sectional view of the distal corn insert end portion of the creamer sleeve, more particularly illustrating; a second blade position or orientation of the creamer blade of each creamer blade assembly, resulting in creamier corn in typical application of the corn creamer.
Figure 10B:
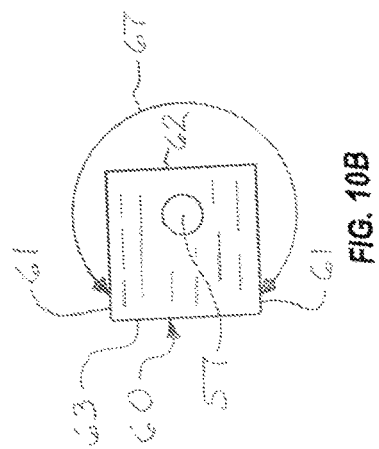
FIG. 10B is a top view of a typical creamer blade of a creamer blade assembly, more particularly illustrating typical adjustability of the creamer blade in a plurality of blade positions within a circular blade arc in the sleeve interior of the creamer sleeve.

As illustrated in FIGS. 9, 10A and 10B, in some embodiments, each creamer blade 60 may be rectangular. Accordingly, each creamer blade 60 may have a pair of side blade edges 61 which may be generally spaced-apart with respect to each other. A cutting blade edge 62 may extend between the side blade edges 61. A blunt blade edge 63 may extend between the side blade edges 61 in spaced-apart relationship to the cutting blade edge 62, In some embodiments, each creamer blade 60 may be generally elongated. The blade shaft 57 may be attached to the creamer blade 50 in an off-centered configuration. Accordingly, the proximal blade end 63 may be proximate or positionally closer to the blade shaft 57 than the distal blade end 64, whereas the distal blade end 64 may be distal to or positionally farther from the blade shaft 57 than the proximal blade end 63. In other embodiments, the blade shaft 57 may be attached to the creamer blade 50 at the center of the creamer blade 50. In some embodiments, each creamer blade 60 may have a square or other regular polygonal shape. In other embodiments, each creamer blade 60 may have an oval or other shape.

As illustrated in FIG. 10B, the creamer blade 60 of each creamer blade assembly 56 may be selectively deployable in a selected one of a plurality of blade positions within a circular blade are in the sleeve interior 50. As illustrated in FIGS. 9 and 10A, in some applications, a blade axis 66 of the creamer blade 60 may be oriented at an angle to a longitudinal sleeve axis 54 of the creamer sleeve 44. In a first blade position or orientation of the cutting blade 60 (FIG. 9), the cutting blade edge 62 may be distal to or farther from the corn insert end 47 whereas the blunt blade end 63 may be proximate or closer to the corn insert end 47 of the creamer sleeve 44. In a second blade position or orientation of the cutting blade 60 (FIG. 10), the cutting blade edge 62 may be proximate or closer to the corn insert end 47 whereas the blunt blade end 63 may be distal to or farther from the corn insert end 47 of the creamer sleeve 44. The first blade position (FIG. 9) may result in courser corn whereas the second blade position (FIG. 10) may result in creamer corn in typical operation of the corn creamer 1, which will be hereinafter described.

Figure 4:
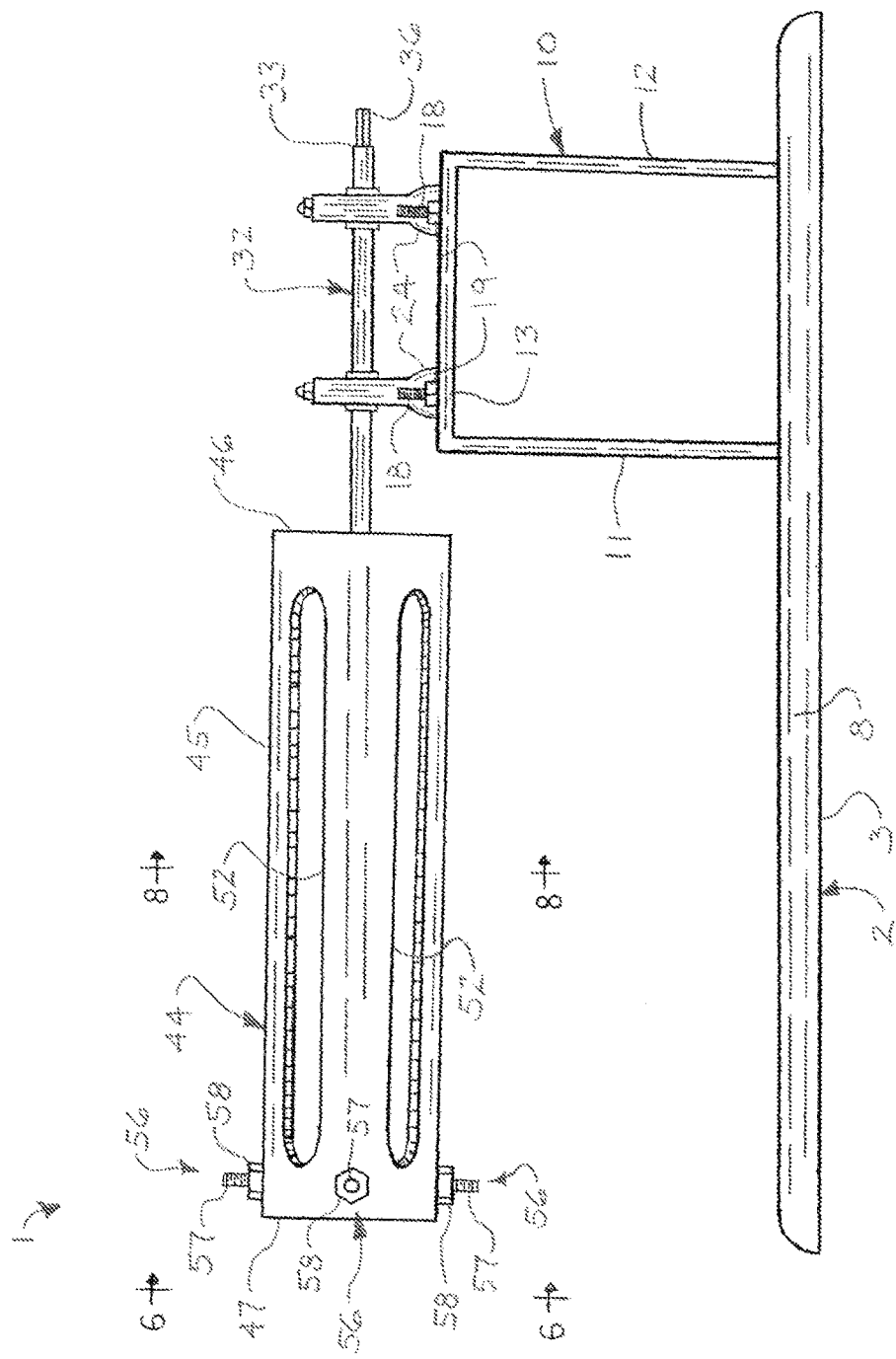
FIG. 4 is a side view of the illustrative corn creamer with the creamer shield removed.

As illustrated in FIGS. 3, 5 and 6, in some embodiments, multiple creamer blade assemblies 56 may be provided in spaced-apart relationship to each other around the circumference of the sleeve wall 45 of the creamer sleeve 44. As illustrated in FIG. 6, in some embodiments, the creamer blades 60 of the respective creamer blade assemblies 56 may be oriented at 90 degrees with respect to each other about the circumference of the sleeve wall 45. Accordingly, as they remove the corn kernels 81 (FIG. 12) from the ear of corn 80, the creamer blades 60 may stabilize the ear of corn 80 in the sleeve interior 50 of the rotating creamer sleeve 44, as will be hereinafter described. As illustrated in FIGS. 3-5, in some embodiments, the creamer blade assemblies 56 may be positioned in staggered relationship to the sleeve apertures 52 in the sleeve wall 45 of the creamer sleeve 44.

Figure 13:
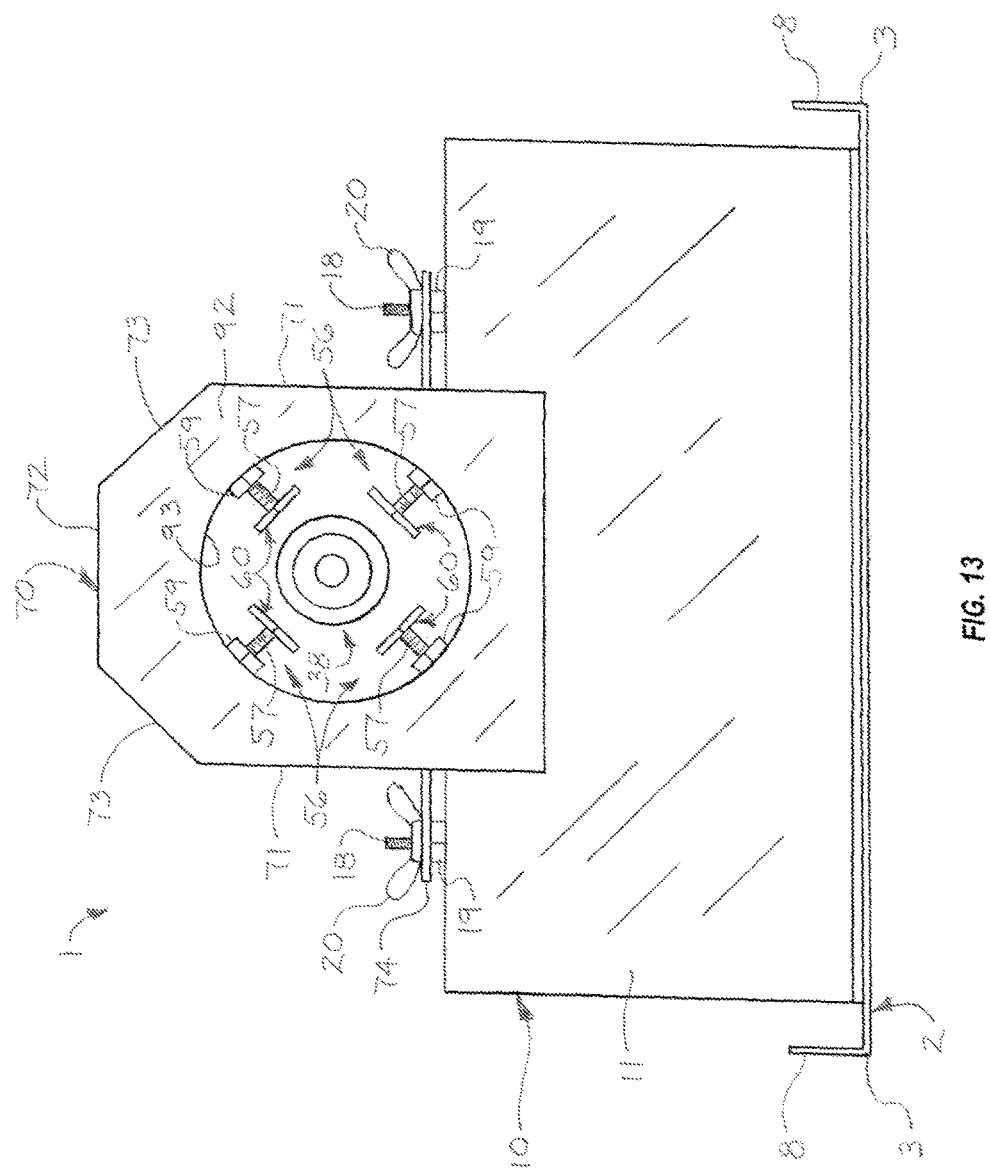
FIG. 13 is a front view of the illustrative corn creamer.
Figure 14:
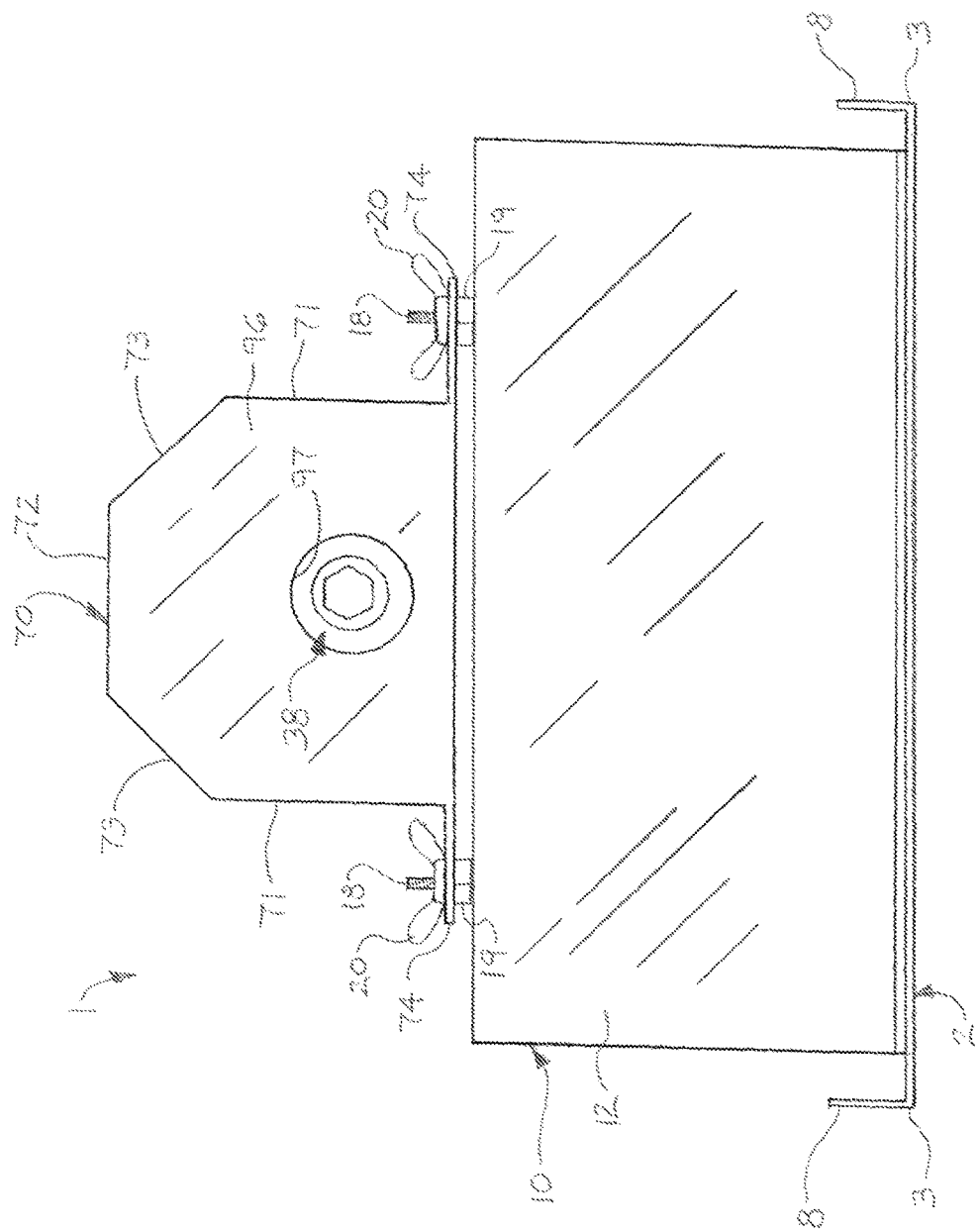
FIG. 14 is a rear iew of the illustrative corn creamer.

The sleeve shield 70 may have any design which is suitable for the purpose of covering or enclosing the creamer sleeve 44. Accordingly, as illustrated in FIG. 1, in some embodiments, the sleeve shield 70 may be generally elongated. As illustrated in FIGS. 13 and 14, the sleeve shield 70 may include a pair of spaced-apart side shield portions 71 (one of which is illustrated). A top shield portion 72 may extend between the side shield portions 71. Beveled shield portions 73 may extend between the top shield portion 72 and the respective side shield portions 71. In other embodiments, the sleeve shield 70 may have a curved, arcuate or other shape.

A front shield wall 92 (FIG. 13) and a rear shield wall 96 (FIG. 14) may be provided on the respective front and rear ends of the side shield portions 71, the top shield portion 72 and the beveled shield portions 73. A corn insert opening 93 (FIG. 13) may extend through the front shield wall 92 at the corn insert end 47 of the creamer sleeve 44. A shaft opening 97 (FIG. 14) may extend through the rear shield wall 96. Accordingly, the drive splines 36 on the sleeve drive shaft 32 may extend throuh the shaft opening 97 to facilitate engagement of the hand drill 76 (FIG. 11) with the drive splines 36.

The sleeve shield 70 may be may be mounted in place on the shaft mount platform 10 and over the creamer sleeve 44 using any suitable technique which is known by those skilled in the art. Accordingly, in some embodiments, at least one shield attachment flange 74 may extend from the side shield portion 71 of the sleeve shield 70. At least one shield mount fastener 18 may extend through at least one fastener opening (not illustrated) in the platform bridge portion 13 of the shaft mount platform 10. At least one nut 19 may be threaded on the shield mount fastener 18.

As further illustrated in FIG. 1, each shield mount fastener 18 may be extended through a corresponding fastener opening (not illustrated) in the shield attachment flange 74. At least one wing nut 20 may be threaded on the shield mount fastener 18 and tightened against the shield attachment flange 74 to detachably secure the sleeve shield 70 on the shaft mount platform 10.

Referring next to FIGS. 6, 7, 11 and 12 of the drawings, in typical application, the corn creamer 1 may remove corn kernels 81 (FIG. 12) from an ear of corn 80 as the creamer sleeve 44 is rotated and the ear of corn 80 is inserted in the sleeve interior 50 of the rotating creamer sleeve 44. Accordingly, as illustrated in FIG. 12, a kernel-collecting container 84 (illustrated in phantom) may initially be placed on the creamer base 2 in the container space 15 (FIG. 2) between the side base flanges 8. As illustrated in FIG. 11, the hand drill 76 may be drivingly coupled to the sleeve drive shaft 32 by engagement of the drill chuck 77 on the hand drill 76 with the shaft splines 36 on the driven shaft end 33 of sleeve drive shaft 32.

The sleeve shield 70 may be removed typically by unthreading the wing nuts 20 from the respective shield mount fasteners 18 and the shield attachment flange 74 from the shaft mount platform 10. The creamer blade assemblies 56 may be adjusted an the creamer sleeve 44 to accommodate ears of corn 80 of different types and having various diameters. Accordingly, the radial positions of the creamer blades 60 of the respective creamer blade assemblies 56 in the sleeve interior 50 of the creamer sleeve 44 may be adjusted by threading the blade shaft 57 in the outer shell nut 58 and the inner shell nut 59 of each corresponding creamer blade assembly 56. As illustrated in FIG. 6, this adjustment may vary the position of each blade shaft 57 alone each corresponding blade shaft axis 65 and deploy the creamer blades 60 at the selected radial position relative to the geometric center of the sleeve interior 50. Thus, as illustrated in FIG. 7, the creamer blades 60 will engage the ear of corn 80 with sufficient proximity to facilitate removal of the corn kernels 81 from the ear of 80 upon subsequent rotation of the creamer sleeve 44 by operation of the hand drill 76.

In some applications, each creamer blade 60 may be adjusted to the first blade position illustrated in FIG. 9 or the second blade position illustrated in FIG. 10. This may be accomplished by rotating, each blade shall 57 in the corresponding outer shell nut 58 and inner shell nut 59 of each corresponding creamer blade assembly 56 until the blade axis 66 of each creamer blade 60 is oriented at an angle to the longitudinal sleeve axis 54. In the first blade position illustrated in FIG. 9, the blunt blade edge 61 of the cutting blade 60 may be proximate or closer to the corn insert end 47, whereas in the second blade position illustrated in FIG. 10, the cuffing blade edge 62 of the cutting blade 60 may be proximate or closer to the corn insert end 47 of the creamer sleeve 44.

As illustrated in FIG. 12, the hand drill 76 (FIG. 11) may next be operated to rotate the sleeve drive shaft 32. The sleeve drive shaft 32 may, in turn, rotate the creamer sleeve 44. The ear of corn 60 may be manually inserted through the corn insert opening 93 (FIG. 13) in the front shield wall 92 of the sleeve shield 70 and into the sleeve interior 50 of the rotating creamer sleeve 44 through the registering corn insert end 47 of the creamer sleeve 44. Accordimly, as they rotate with the creamer sleeve 44, the creamer blades 60 of the respective creamer blade assemblies 56 may contact and shear the corn kernels 81 from the ear of corn 60. As further illustrated in FIG. 12, as the creamer sleeve 44 rotates, the ear of corn 60 may be manually moved in a linear motion 88 into the sleeve interior 50 to ensure that the creamer blades 60 uniformly contact and shear all the corn kernels 81 from the ear of corn 80. The sheared or removed corn kernels 81 may fall from the sleeve interior 50 through the sleeve apertures 52 into the underlying kernel-collecting container 84. The sleeve shield 70 (FIG. 1) may deflect corn kernels 81 which may be ejected upwardly from the sleeve interior 50 through the sleeve apertures 52 back into the sleeve interior 50 or into the kernel-collecting container 84.

In some applications, multiple ears of corn 80 may be successively inserted in the sleeve interior 50 in the foregoing manner to remove the corn kernels 81 from the respective ears of corn 80. The kernel-collecting container 84 may be removed from the creamer base 2 and the corn kernels 81 removed from the kernel-collecting container 84. The removed corn kernels 81 may be subsequently cooked to prepare creamed corn for consumption.

As illustrated in FIGS. 9 and 10, it will be appreciated by those skilled in the art that the creamer blade 60 of each creamer blade assembly 56 may be selectively deployable in a selected one of a plurality of blade positions within a circular blade arc in the sleeve interior 50 of the creamer sleeve 44. For example and without limitation, the creamer blade 60 may be selectively deployable in the first blade position (FIG. 9) in which the blunt blade edge 63 is proximate or closer to the corn insert end 47 or the second blade position (FIG. 10) in which the cutting blade edge 62 is proximate or closer to the corn insert end 47 of the creamer sleeve 44. It has surprisingly been found that deployment of the creamer blade 60 in the first blade position illustrated in FIG. 9 may result in courser corn kernels 81, whereas deployment of the creamer blade 60 in the second blade position illustrated in FIG. 10 may result in creamier corn kernels 81 in typical application of the corn creamer 1. Therefore, the orientation of the creamer blade 60 in the sleeve interior 50 may be selected to produce corn kernels 81 preparation of which results in creamed corn having a courser or creamier consistency according to the tastes and preferences of the consumer.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A corn creamer, comprising:
a creamer base;
a rotatable sleeve drive shaft carried by the creamer base;
a creamer sleeve drivingly connected to a motor for rotation by the rotatable sleeve drive shaft, the creamer sleeve having a sleeve wall and a sleeve interior formed by the sleeve wall; and
at least one creamer blade assembly including:
at least one blade shaft carried by the sleeve wall of the creamer sleeve, the at least one blade shaft having a blade shaft axis; and
at least one creamer blade carried by the at least one blade shaft in the sleeve interior, the at least one creamer blade having a cutting plane perpendicular to the blade shaft axis of the at least one blade shaft.

2. The corn creamer of claim 1 wherein the at least one creamer blade comprises a cutting blade edge, a blunt blade edge and a pair of side blade edges extending between the cutting blade edge and the blunt blade edge.

3. The corn creamer of claim 2 wherein the at least one creamer blade is selectively deployable in a selected one of a plurality of blade positions within a circular blade arc in the sleeve interior.

4. The corn creamer claim 1 wherein the at least one creamer blade is rectangular or square.

5. The corn creamer of claim 1 wherein the motor comprises a hand drill, and further comprising a plurality of shaft splines on the sleeve drive shaft, the plurality of shaft splines configured for engagement by the hand, drill for rotation of the sleeve drive shaft.

6. The corn creamer of claim 1 wherein the at least one creamer blade assembly comprises a plurality of creamer blade assemblies and the at least one creamer blade comprises a plurality of creamer blades, respectively.

7. The corn creamer of claim 6 wherein the plurality of creamer blades of the plurality of creamer blade assemblies, respectively, are oriented at 90 degrees with respect to each other about the creamer sleeve.

8. The corn creamer of claim 1 wherein the at least one creamer blade assembly further comprises an outer shaft nut and an inner shaft nut threadably engaging the at least one blade shaft exterior to and inside, respectively, the sleeve interior of the creamer sleeve.

9. A corn creamer, comprising:
a creamer base;
a rotatable sleeve drive shaft carried by the creamer base;
a creamer sleeve drivingly connected to a motor for rotation by the rotatable sleeve drive shaft, the creamer sleeve having a sleeve wall with a drive end and a corn insert end, a sleeve interior formed by the sleeve wall and extending from the drive end to the corn insert end and at least one sleeve aperture extending through the sleeve wall;
at least one creamer blade assembly carried by the sleeve wall of the creamer sleeve, the at least one creamer blade assembly including:
at least one blade shaft carried by the sleeve wall, the at least one blade shaft configured for selective rotational and radial adjustment within the sleeve interior; and
at least one creamer blade carried by the at least one blade shaft in the sleeve interior, the at least one creamer blade including:
a cutting blade edge;
a blunt blade edge spaced-apart from the cutting blade edge;
and
a pair of side blade edges extending between the cutting blade edge and the blunt blade edge.

10. The corn creamer of claim 9 wherein the at least one creamer blade is selectively deployable in a first blade position with the cutting blade edge distal to the corn insert end of the creamer sleeve and a second blade position with the cutting blade edge proximate to the corn insert end of the creamer sleeve.

11. The corn creamer of claim 9 wherein the at least one creamer blade is rectangular or square.

12. The corn creamer of claim 9 wherein the motor comprises a hand drill, and further comprising a plurality of shaft splines on the sleeve drive shaft, the plurality of shaft splines configured for engagement by the motor for rotation of the sleeve drive shaft.

13. The corn creamer of claim 9 wherein the at least one creamer blade assembly comprises a plurality of creamer blade assemblies and the at least one creamer blade comprises a plurality of creamer blades, respectively.

14. The corn creamer of claim 13 wherein the plurality of creamer blades of the plurality of creamer blade assemblies, respectively, are oriented at 90 degrees with respect to each other about the creamer sleeve.

15. The corn creamer of claim 9 wherein the at least one creamer blade assembly further comprises an outer shaft nut and an inner shaft nut threadably engaging the at least one blade shaft exterior to and inside, respectively, the sleeve interior of the creamer sleeve.

16. A corn creamer, comprising:
a creamer base;
a rotatable sleeve drive shaft carried by the creamer base;
a plurality of shaft splims on the rotatable sleeve drive shaft, the plurality of shaft splines configured for engagement by a hand drill for rotation of the sleeve drive shaft;
a creamer sleeve drivingly engaged for rotation by the sleeve drive shaft, the creamer sleeve having a sleeve wall with a drive end, a corn insert end, a sleeve interior formed by the sleeve wall and extending between the drive end and the corn insert end and at least one sleeve aperture extending through the sleeve wall;
at least one creamer blade assembly carried by the sleeve wall of the creamer sleeve, the at least one creamer blade assembly including:
at least one blade shaft carried by the sleeve wall, the at least one blade shaft configured for selective rotational and radial adjustment within the sleeve interior; and
at least one creamer blade carried by the at least one blade shaft in the sleeve interior, the at least one creamer blade having a cutting plane perpendicular to the blade shaft axis of the at least one blade shaft and including:
a cutting blade edge;
a blunt blade edge; and
a pair of side blade edge extending between the cutting blade edge and the blunt blade edge; and
the at least one creamer blade is selectively deployable in a first blade position with the cutting blade edge distal to the corn insert end of the creamer sleeve and a second blade position with the cutting blade edge proximate to the corn insert end of the creamer sleeve.

17. The corn creamer of claim 16 wherein the at least one creamer blade is rectangular or square.

18. The corn creamer of claim 16 wherein the at least one creamer blade assembly comprises a plurality of creamer blade assemblies and the at least one creamer blade comprises a plurality of creamer blades, respectively.

19. The corn creamer of claim 18 wherein the plurality of creamer blades of the plurality of creamer blade assemblies, respectively, are oriented at 90 degrees with respect to each other about the creamer sleeve.

20. The corn creamer of claim 16 wherein the at least one creamer blade assembly further comprises an outer shalt nut and an inner shaft nut threadably engaging the at least one blade shaft exterior to and inside, respectively, the sleeve interior of the creamer sleeve.

* * * * *